United States Patent
Dias Carlson et al.

(10) Patent No.: US 10,763,713 B2
(45) Date of Patent: Sep. 1, 2020

(54) PERMANENT MAGNET MOTOR WITH PASSIVELY CONTROLLED VARIABLE ROTOR/STATOR ALIGNMENT

(71) Applicant: Indigo Technologies, Inc., Cambridge, MA (US)

(72) Inventors: Rachel A. Dias Carlson, Somerville, MA (US); Scott T. Purchase, Cambridge, MA (US)

(73) Assignee: Indigo Technologies, Inc., Woburn, MA (US)

( * ) Notice: Subject to any disclaimer, the term of this patent is extended or adjusted under 35 U.S.C. 154(b) by 0 days.

(21) Appl. No.: 15/927,328

(22) Filed: Mar. 21, 2018

(65) Prior Publication Data
US 2019/0074736 A1    Mar. 7, 2019

Related U.S. Application Data

(60) Provisional application No. 62/554,068, filed on Sep. 5, 2017.

(51) Int. Cl.
*H02K 7/09* (2006.01)
*H02K 1/27* (2006.01)
(Continued)

(52) U.S. Cl.
CPC .............. *H02K 1/276* (2013.01); *H02K 7/09* (2013.01); *H02K 21/12* (2013.01); *H02K 29/03* (2013.01);
(Continued)

(58) Field of Classification Search
CPC .... H02K 21/02; H02K 21/024; H02K 21/026; H02K 21/028; H02K 21/12; H02K 1/27;
(Continued)

(56) References Cited

U.S. PATENT DOCUMENTS

| | | | | |
|---|---|---|---|---|
| 4,920,295 A | * | 4/1990 | Holden | ............... H02K 21/027 310/191 |
| 6,194,802 B1 | * | 2/2001 | Rao | ...................... H02K 21/024 310/191 |

(Continued)

FOREIGN PATENT DOCUMENTS

GB        1051591 A    2/1966

OTHER PUBLICATIONS

International Search Report and Written Opinion in PCT/US2018/044955 dated Oct. 5, 2018.

*Primary Examiner* — Tran N Nguyen
(74) *Attorney, Agent, or Firm* — Smith Baluch LLP

(57) ABSTRACT

An electric motor including: a first and second subsystems, one of which is a magnetic rotor assembly and the other of which is a coil stator assembly; a hub assembly supporting the magnetic rotor assembly and the coil stator assembly and defining an axis of rotation; and a bearing assembly supporting at least one of the first and second subsystems on the hub assembly, wherein the first subsystem has an array of lift-generating elements for generating axially directed magnetic fields, the second subsystem has an electrically conductive region aligned with and opposite to the array of lift-generating elements of the first subsystem, and wherein the bearing assembly enables the magnetic rotor assembly to rotate about the rotational axis of the hub assembly and enables the separation distance of the magnetic rotor assembly from the coil stator assembly to change.

20 Claims, 14 Drawing Sheets

(51) Int. Cl.
*H02P 6/08* (2016.01)
*H02P 21/06* (2016.01)
*H02K 29/03* (2006.01)
*H02K 21/12* (2006.01)
*H02P 25/024* (2016.01)
*H02K 3/18* (2006.01)
*H02K 21/24* (2006.01)
*H02K 1/28* (2006.01)
*H02K 21/22* (2006.01)

(52) U.S. Cl.
CPC ............... *H02P 6/08* (2013.01); *H02P 21/06* (2013.01); *H02P 25/024* (2016.02); *H02K 1/28* (2013.01); *H02K 3/18* (2013.01); *H02K 21/22* (2013.01); *H02K 21/24* (2013.01); *H02K 2213/03* (2013.01); *H02P 2207/055* (2013.01)

(58) Field of Classification Search
CPC .......... H02K 1/276; H02K 7/09; H02K 29/03; H02K 11/04; H02K 11/048; H02K 16/02; H02K 16/04; H02K 41/02; H02K 23/36; H02P 6/08; H02P 9/00; H02P 21/06; H02P 25/022
See application file for complete search history.

(56) References Cited

U.S. PATENT DOCUMENTS

| | | | |
|---|---|---|---|
| 6,201,329 B1 * | 3/2001 | Chen | ............... F16C 32/0444 310/90.5 |
| 2004/0141861 A1 | 7/2004 | Davis et al. | |
| 2007/0216252 A1 | 9/2007 | Shibukawa | |

* cited by examiner

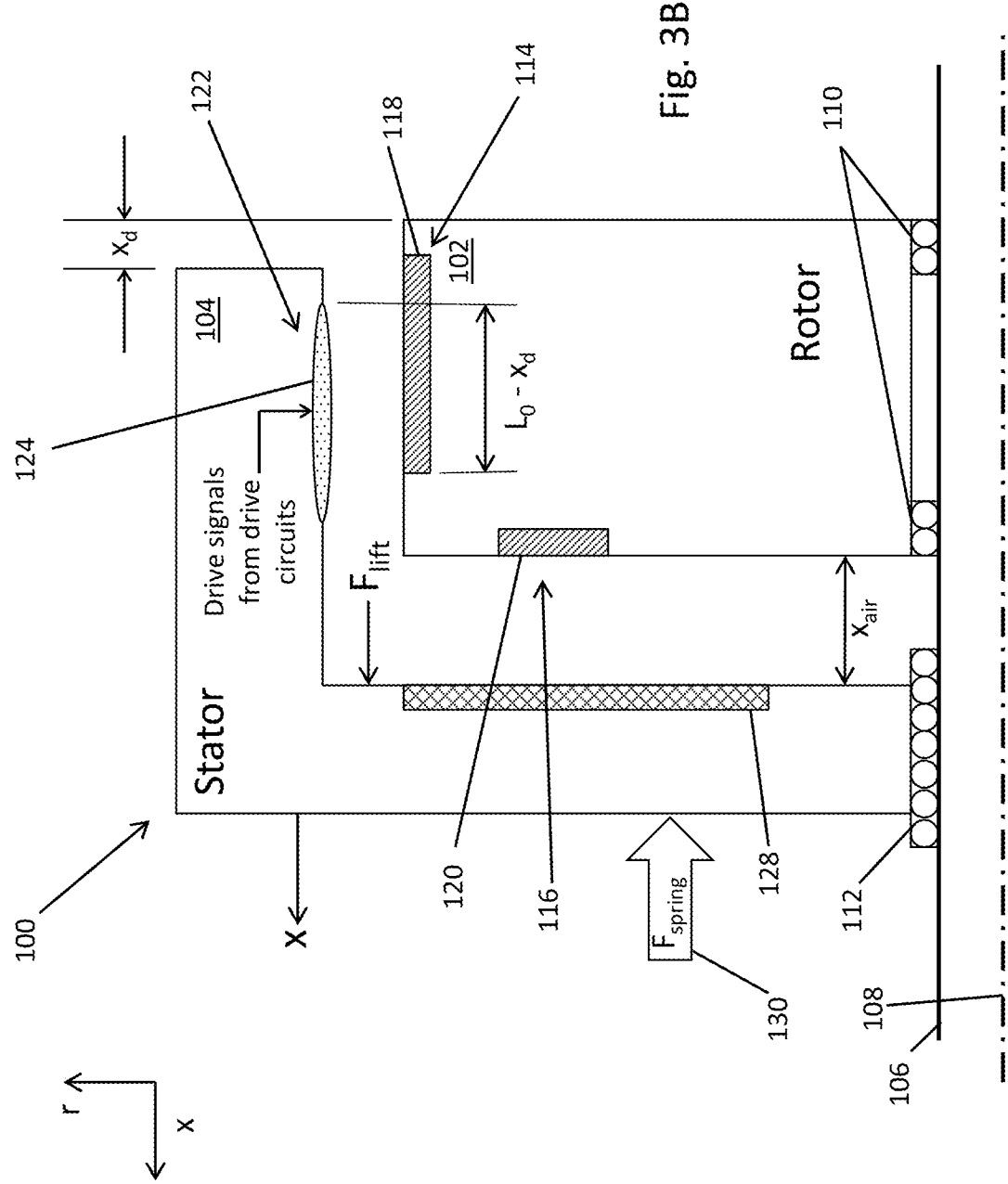

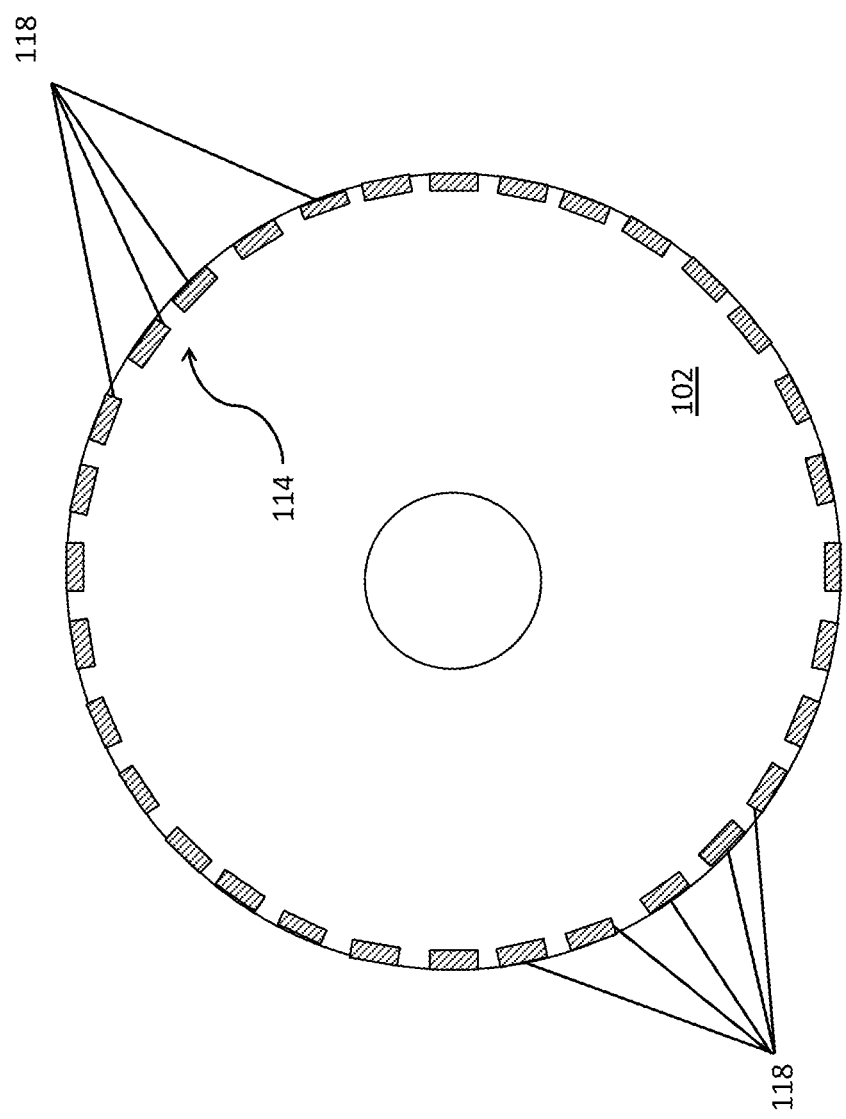

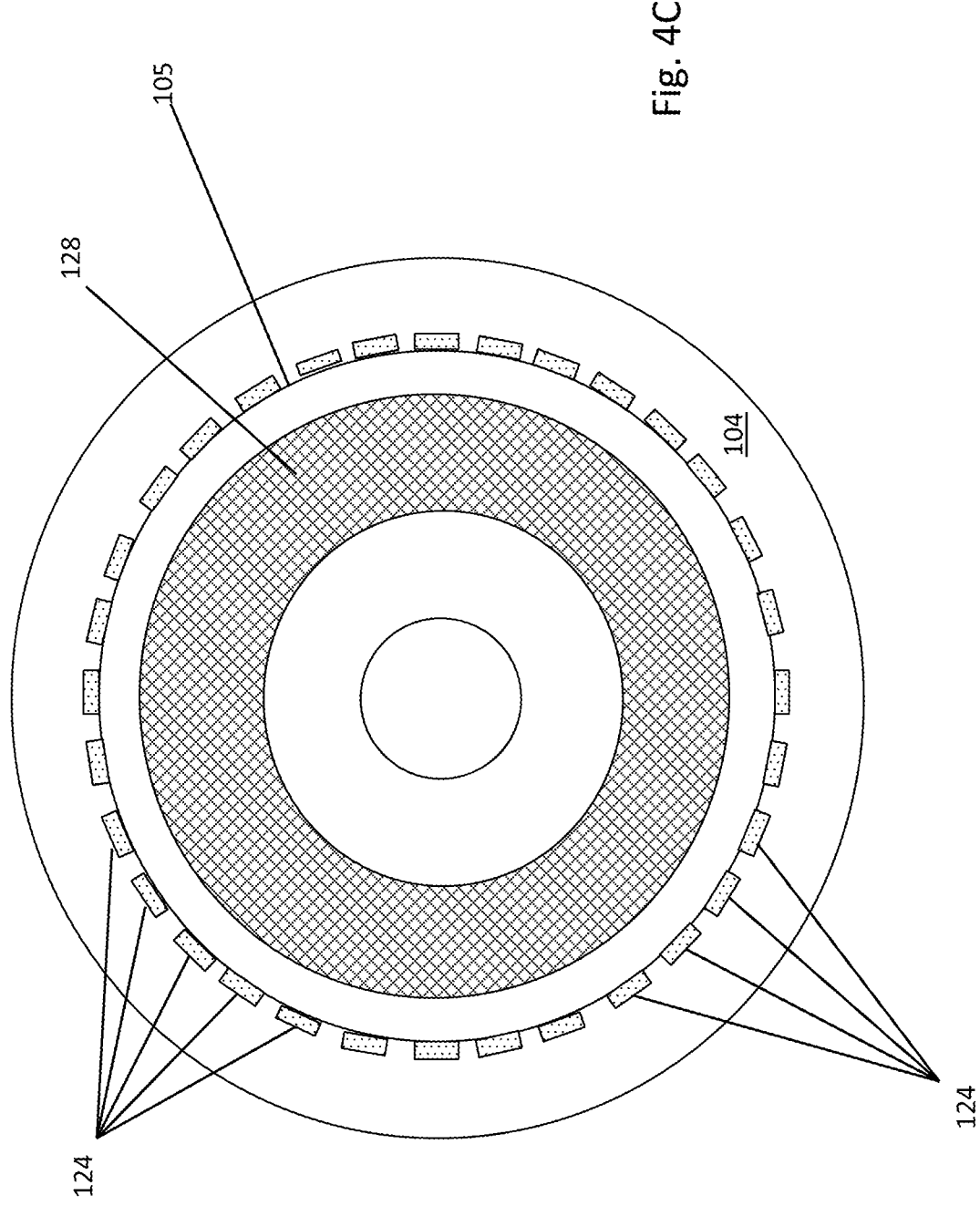

PERMANENT MAGNET MOTOR WITH PASSIVELY CONTROLLED VARIABLE ROTOR/STATOR ALIGNMENT

CROSS-REFERENCE TO RELATED APPLICATION

This application claims the benefit of U.S. Provisional Application No. 62/554,068, filed Sep. 5, 2017, all of which is incorporated herein by reference.

TECHNICAL FIELD

Embodiments of the invention generally relate to electric motors and more specifically to electric motors that exhibit a variable torque constant.

BACKGROUND

Electric motors can be characterized by a torque constant, Kt, which is basically the torque produced by the motor divided by the coil current required to produce that torque. Motors with a high torque constant generally are useful for producing high torque at low RPM; whereas motors with a lower torque constant can be more suited to producing higher speeds, where high torque is not required. In a very general sense, torque constant is a measure of the electromagnetic coupling between the coil assembly and the magnetic rotor assembly. Higher coupling produces a higher torque constant as compared to lower coupling. But one of the downsides of using a motor with a higher torque constant is the relatively higher back EMF and induced eddy currents that are generated at the higher speeds. That back EMF and the induced eddy currents lower the maximum speed that is achievable by the motor and result in higher losses at the higher speeds, i.e., less efficient operation. Therefore, it might be desirable to vary the torque constant over the range of operation, providing a higher torque constant at lower speeds and a lower torque constant at higher speeds.

SUMMARY

In general, in one aspect, the invention features an electric motor including: a first subsystem and a second subsystem, one of the first and second subsystems including a magnetic rotor assembly and the other one of the first and second subsystems comprising a coil stator assembly; a hub assembly supporting the magnetic rotor assembly and the coil stator assembly and defining an axis of rotation; and a bearing assembly supporting at least one of the first and second subsystems on the hub assembly The magnetic rotor assembly includes an array of torque-generating magnets; the coil stator assembly includes an array of driving coils opposing the array of torque-generating magnets of the magnetic stator assembly; the first subsystem includes an array of lift-generating elements for generating axially directed magnetic fields; the second subsystem includes an electrically conductive region aligned with and opposite to the array of lift-generating elements of the first subsystem, the array of lift-generating elements and the electrically conductive region separated from each other in the axial direction by a separation distance; and wherein the bearing assembly enables the magnetic rotor assembly to rotate about the rotational axis of the hub assembly and enables the separation distance of the magnetic rotor assembly and the coil stator assembly to change in response to a lift force generated by the relative movement of the array of lift generating element and the electrically conductive region with respect to each other.

Other embodiments include one or more of the following features. The bearing assembly supports one or both of the first subsystem on the hub assembly and the second subsystem on the hub assembly. The first subsystem includes the magnetic rotor assembly and the second subsystem includes the coil stator assembly; or alternatively, the first subsystem includes the coil stator assembly and the second subsystem includes the magnetic rotor assembly. The array of lift-generating elements is an array of permanent magnets or an array of electric coils. The bearing assembly includes a rotary bearing assembly supporting the magnetic rotor assembly on the hub assembly. The bearing assembly includes a linear bearing assembly supporting the coil stator assembly on the hub assembly. The bearing assembly supports the magnetic rotor assembly on the hub assembly and enables the magnetic rotor assembly to rotate about the rotational axis and to move back and forth longitudinally along the rotational axis. The second subsystem includes an annularly shaped conductive plate that forms the electrically conductive region. The magnetic rotor assembly and the coil stator assembly form a radial flux motor or an axial flux motor.

BRIEF DESCRIPTION OF THE DRAWINGS

FIGS. 3A-B illustrate an embodiment in which the stator assembly moves axially in response to a rotating magnetic rotor assembly.

FIG. 4B shows the torque-generating magnet array on the perimeter wall of the magnetic rotor assembly.

FIG. 4C shows the coil array and the conductive plate on the coil stator assembly.

In the preceding figures, like elements and like components may be identified with like reference numbers.

DETAILED DESCRIPTION

The permanent magnet (PM) synchronous motors described herein provide a mechanism for varying the torque constant of the motor to achieve improved efficiency over a broader range torque/speed (e.g. low torque and high speed and high torque at low speed). In general, the motors change the torque constant passively and in a way that is directly correlated to current and/or speed of motor. They employ a separate magnetic field generating array that creates lift (and drag), the magnitude of which depends on the speed of the motor. The resulting lift moves one of the motor elements in an axial direction relative to the other element, thereby changing the magnet engagement length and thus, the torque constant.

The lift mechanism relies on the eddy currents induced in a conductive plate by a magnet field as it moves over the conductive plate. The induced eddy currents generate their own magnetic field that opposes the magnetic field of the magnet. The interaction of the magnetic field of the magnet and the magnetic field produced by the eddy currents yields a force that pushes the magnet away from the conductive plate.

Figure 1:
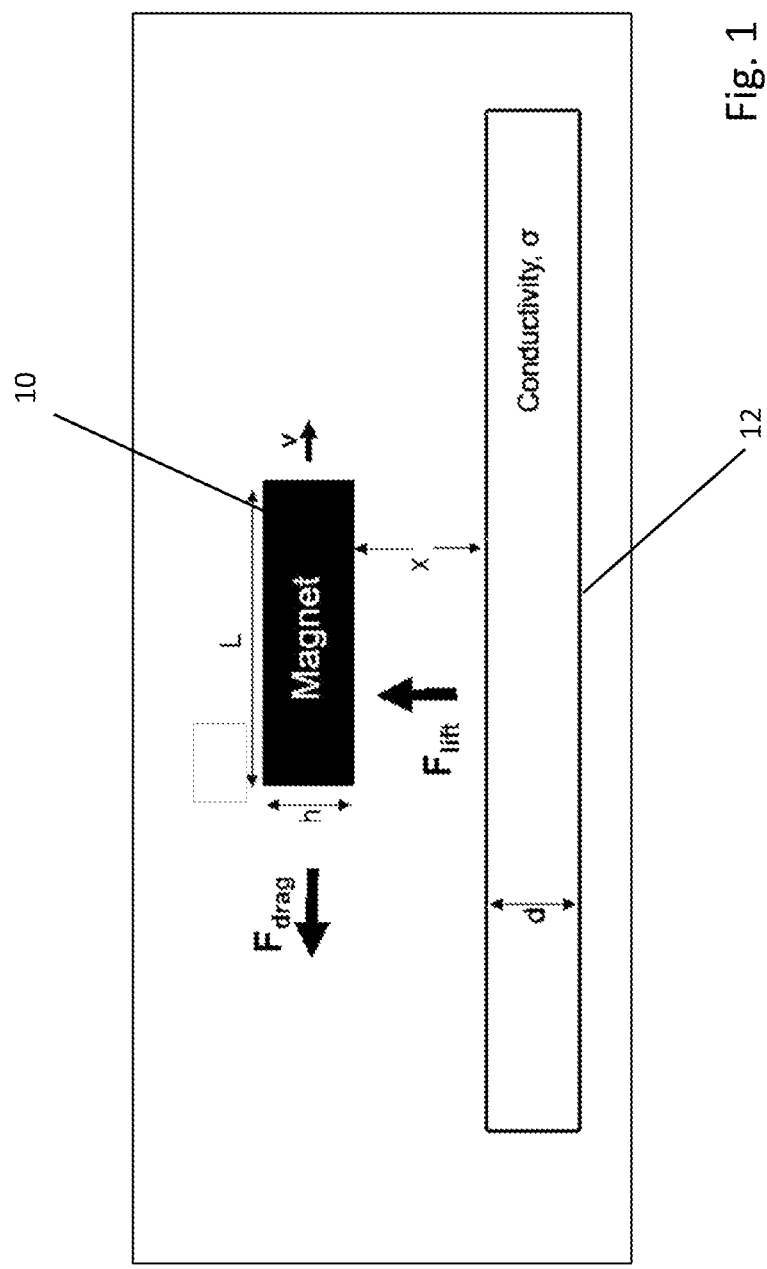
FIG. 1 depicts a moving magnet over an electrically conductive plate.

This is illustrated by FIG. 1 which shows a magnet 10 moving to the right and parallel to a conductive plate 12 at a speed of v and at a distance x above the plate. In this example, the magnet has a length, L, a width, b, and a thickness, h and the conductive plate has a thickness, d. The magnet creates eddy currents in the conductive material that, in turn, act on the magnet with both a repulsive (lift) $F_{lift}$, and a drag force, $F_{drag}$. The directions of these forces are shown in the figures. The law governing this interaction is referred to as Lenz's Law, which says that moving a magnet over a conducting material causes an opposing B field and therefore a lift force. The lift force for the arrangement shown in FIG. 1 is a function of the magnet properties, the geometry of the magnet and conductive plate, and the speed at which the magnet is travelling.

For a radial motor, the lift-generating magnet array will be moving across the conductive plate at some rotational velocity ω, which corresponds to a tangential velocity v, i.e., $$v = \omega r$$

Figure 2:
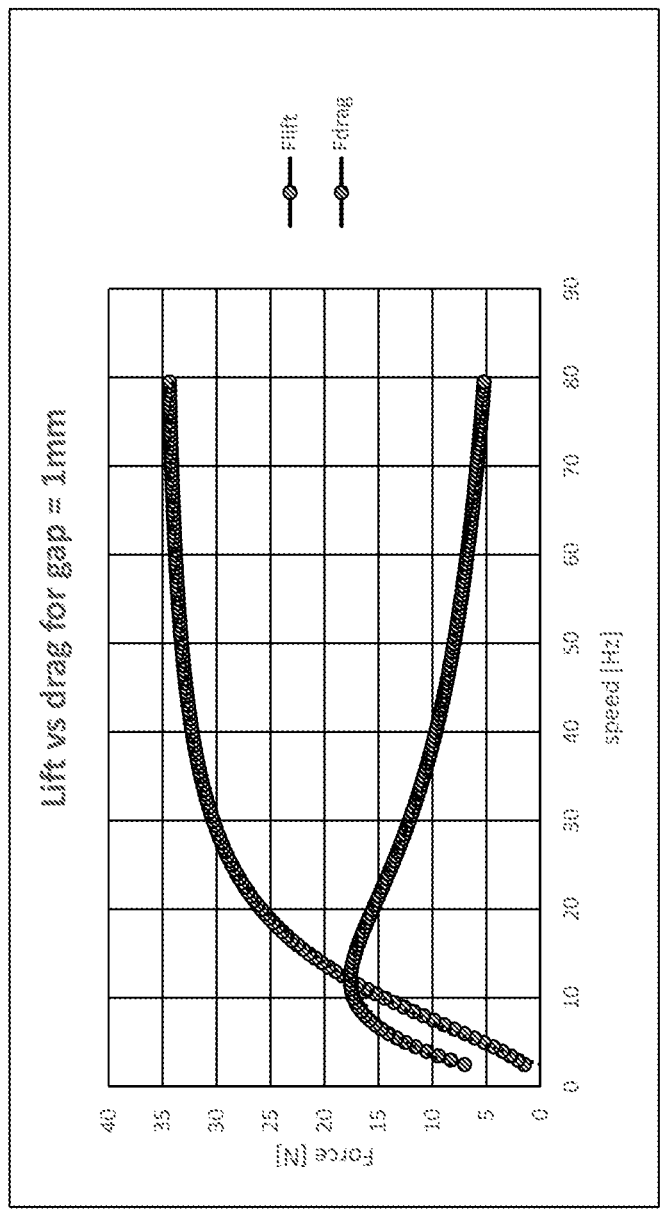
FIG. 2 is a graph of the lift and drag as a function of rotational speed for the system of FIG. 1.

As shown on FIG. 2, for very slow speeds, the drag force will be higher than the lift force. But once a critical velocity is reached, the lift force will become much larger though there will always be some drag force. (Note: In FIG. 2, the lower curve represent the drag force and the upper curve represents the lift force.)

Figure 3A:
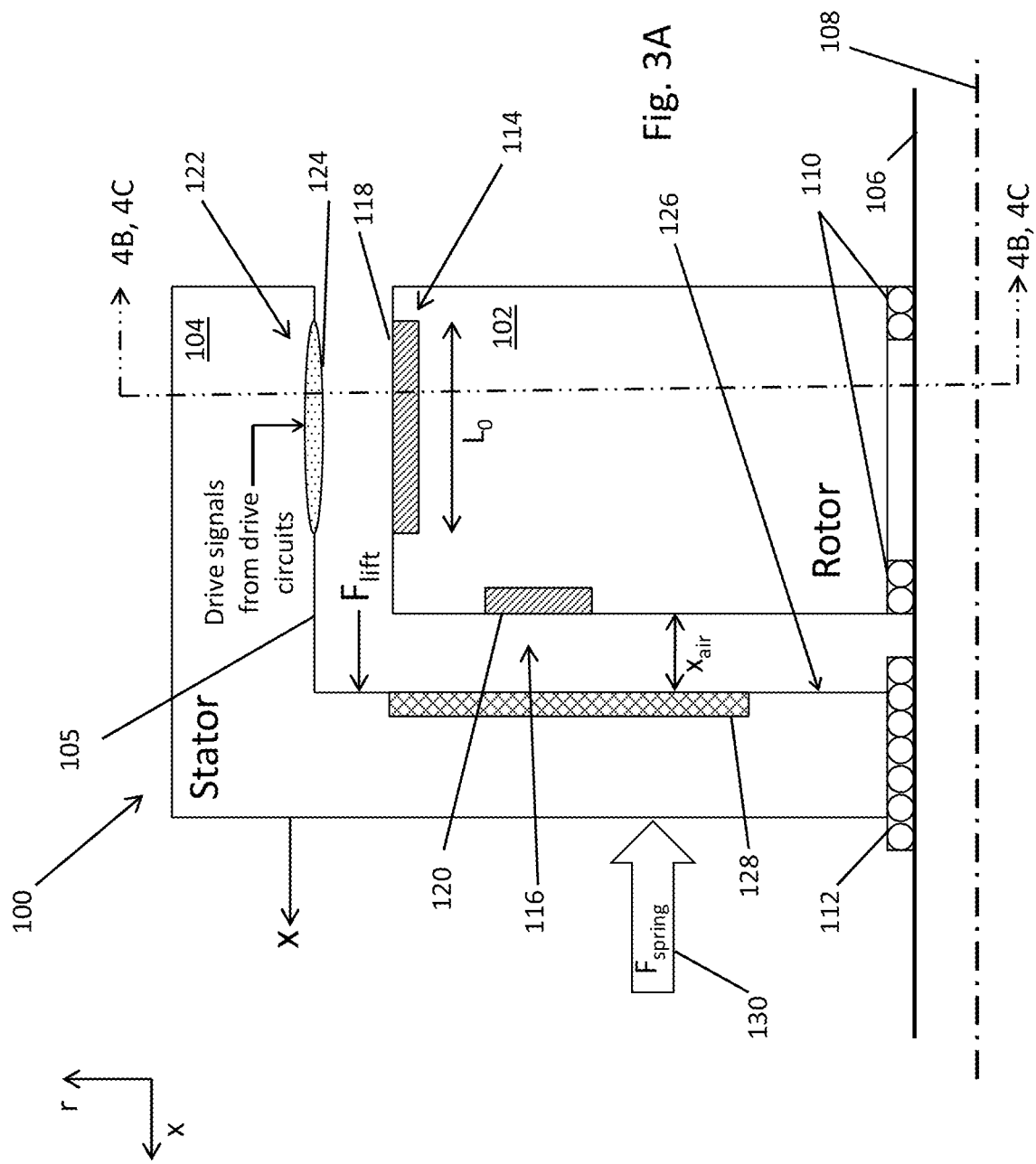

An electric motor 100 in which this principal is employed is depicted schematically in FIG. 3A. It includes a magnetic rotor assembly 102 and a coil stator assembly 104, both of which are mounted on a shaft 106 (or hub assembly) having a longitudinal axis 108. The magnetic rotor assembly 102 is supported on the shaft 106 through bearings 110 which enable the magnetic rotor assembly 102 to rotate about the shaft but do not permit it to move along the shaft in an axial direction. The coil stator assembly 104 on the other hand is mounted on the shaft 106 through a system of linear bearings 112 that permit the coil stator assembly 104 to move back and forth along the shaft in an axial direction but do not permit it to rotate about the shaft.

The magnetic rotor assembly 102 includes two magnet arrays, namely, a torque-generating magnet array 114 and a lift-generating magnet array 116. As shown in FIG. 4B, the torque-generating magnet array 114 is formed by permanent magnets 118 arranged around the perimeter of the magnetic rotor assembly 102 and with their magnetization directions pointing in a radial direction with respect to the axis of rotation of the rotor assembly. For example, the magnets may be identically shaped and identically sized elements that are evenly spaced around the rotor assembly with their magnetization directions switching between a positive radial direction and negative radial direction. Alternatively, the magnetization directions may be arranged to form a Halbach array. The different ways of arranging the permanent magnets of rotor assembly are well known to person skilled in the art.

Figure 4A:
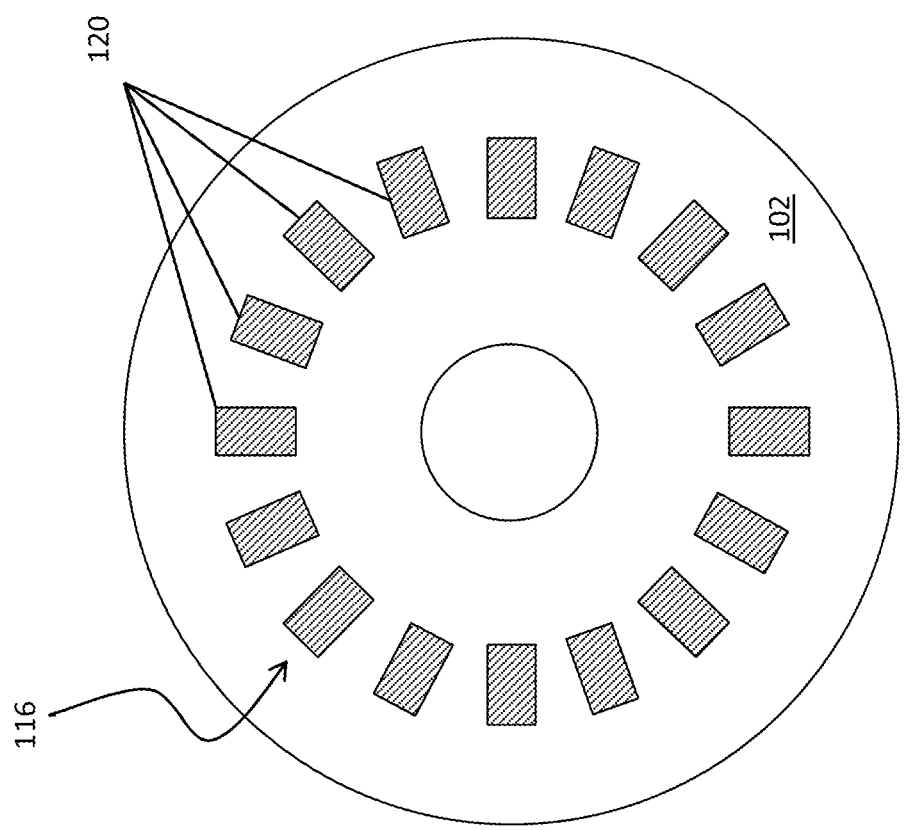
FIG. 4A shows the lift-generating magnet array on one face of the magnetic rotor assembly.

As shown in FIG. 4A, the lift-generating magnet array 116 is formed by permanent magnets 120 arranged in a circular pattern on the face of the magnetic rotor assembly 102 that faces the coil stator assembly 104. The permanent magnets 120 of the lift-generating magnet array 116 are arranged so that their magnetization directions are all pointing in an axial direction with a pattern of N-S-N-S around the array. Alternatively, other patterns could be used such as N-N-S-S-N-N-S-S . . . or a Halbach array to name just two of other possible examples.

In this embodiment, as illustrated by FIG. 4C, the coil stator assembly 104 has a cylindrically shaped outer wall 105 surrounding the magnetic rotor assembly 102 and on the inner side of which are mounted an array of evenly spaced coils 124 of a coil array 122 encircling the rotational axis 108. The coils 124 of the coil array 122 are arranged to be opposite to the magnets 118 of the magnet array 114 with their axes radially directed. When appropriate drive signals are applied to the coils 124, the interaction of the coil-generated magnetic fields with the fields of the magnets 118 will produce a torque on the magnetic rotor assembly 102 causing it to rotate about the rotational axis 108 in a direction and with a speed that depends on the drive signals being applied.

Referring to FIG. 3A, on an inside, vertical wall 126 of the coil stator assembly 104—i.e., the wall that faces the magnetic rotor assembly 102—there is a ring of conductive material (or an annularly shaped conductive plate) 128 (e.g. aluminum plate) that encircles the rotational axis. Alternatively, the body of the coil stator assembly 104 can be made of aluminum (or some electrically conductive material) in which case no separate annularly shaped conductive plate is required but rather the body of the coil stator assembly itself can serve as the conductive ring.

Finally, there is a spring assembly 130 for providing a return force against the backside of the coil stator assembly 104 that resists leftward movement of the coil stator assembly (i.e., movement of the coil stator assembly away from the magnetic rotor assembly). When the motor is not operating, the spring assembly 130 pushes the coil stator assembly 104 towards the magnetic rotor assembly and against a stop (not shown) at which position the drive coil array and the torque-generating magnet array have maximum overlap with each other. In the described embodiment, the spring assembly 130 includes a constant force spring for which the generated force is substantially constant over a range of operation; however, springs with other force characteristics could be used. In addition, means other than springs could be used to generate the return force.

During operation, the movement of the lift-generating magnet array 116 over the conducting plate 128 as the magnetic rotor assembly 102 rotates produces a force, $F_{lift}$, on the coil stator assembly 104 pushing it on its linear bearing assembly 112 to the left and away from the magnetic rotor assembly 102 thereby increasing the gap, $x_{air}$, between the two, as illustrated by FIG. 3B. As the speed of rotation increases, the gap $x_{air}$, increases by an amount that depends on the strength of the lift array, the conductive material properties, and the spring force. As the gap increases, $F_{lift}$ decreases until it equals the force applied by the spring assembly.

If the spring force that returns the stator to the fully engaged position is a constant, as is assumed in this example to be the case, then the lift force will also be a constant throughout the range of operation. That is, $$\Sigma F_x = 0$$

$$F_{spring} = F_{lift} = \text{Constant}$$

For a radial flux motor, the torque constant scales linearly with the magnet engagement length, as follows:

$$Kt(x) = NI(L_0 - x_d)B$$

where $L_0$ is the length of maximum overlap between the coil and the magnet, $(L_0 - x_d)$ is the "engagement length" or the measure of the amount of overlap when the coil has moved a distance $x_d$ away from maximum overlap, N is the number of windings in the coil, I is the current through the coil, and B is the field strength of the magnet as seen by the coil.

Figure 5:
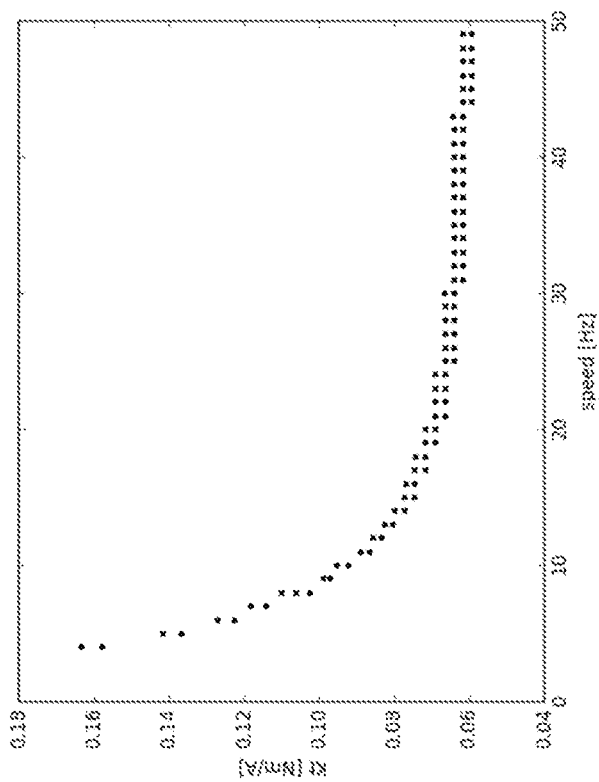
FIG. 5 is a graph of the torque coefficient, Kt, as a function of rotational speed of the magnetic rotor assembly for the system of FIG. 3A.

As note above, as the motor speeds up, the gap $x_{air}$ increases, which decreases the engagement length $(L_0 - x_d)$, thereby decreasing the torque constant Kt. An example graph of this relationship for a constant spring force of 2N for a sample motor is shown in FIG. 5. This means that at higher speeds, the motor will be less voltage limited and will have reduced rotational losses as compared to a motor which has a constant Kt. The rotational losses (such as core losses and eddy current losses) also scale with the engagement length, $(L_0 - x_d)$. In other words, the variable torque constant motor not only has a higher efficiency over a larger range of torque/speed combinations, it also has a higher top speed. This is due to the decrease in torque constant seen at higher speeds, which in turn results on decreased back EMF, allowing the motor to achieve a higher speed for a given drive voltage.

Figure 6A:
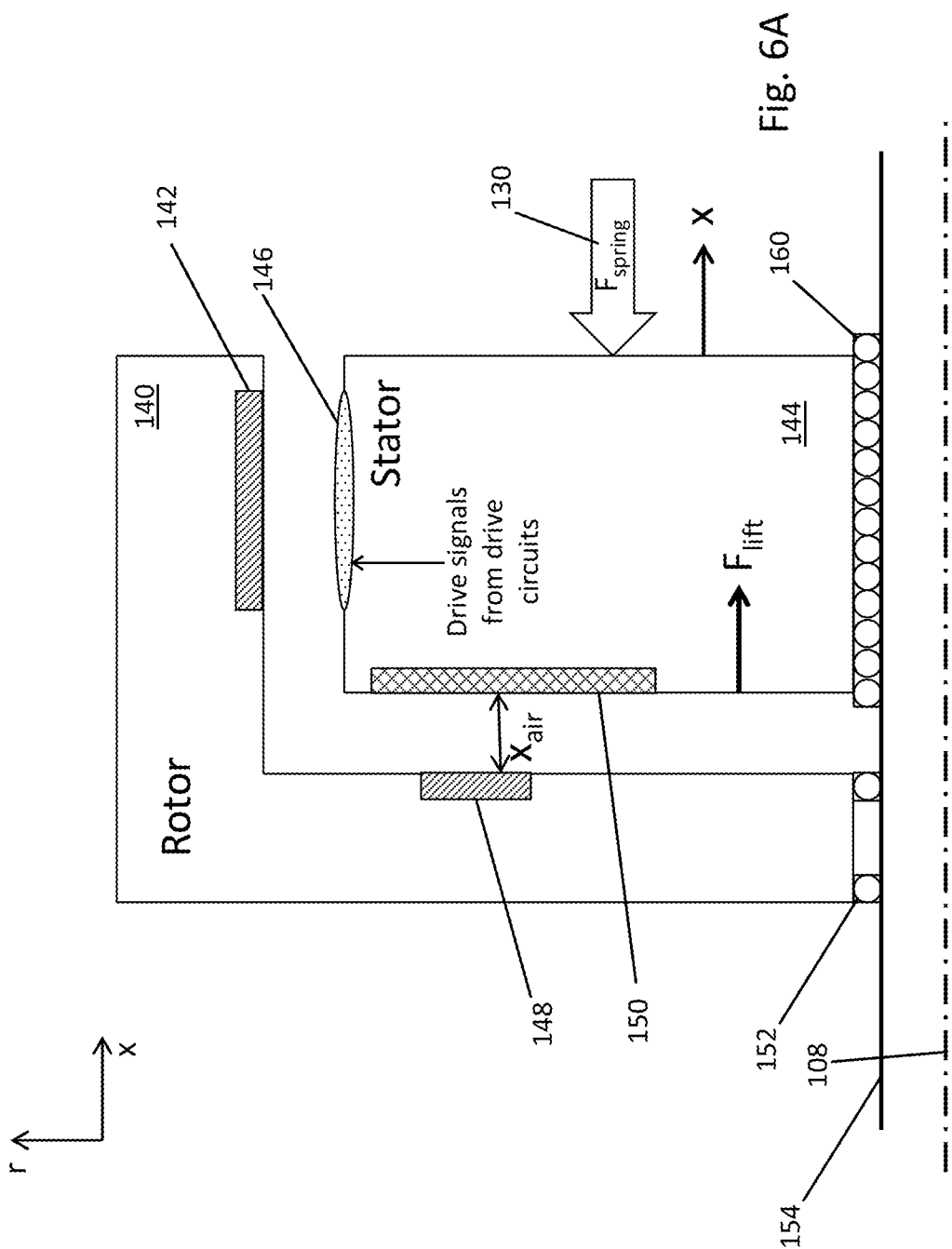
FIG. 6A illustrates an embodiment in which the lift-generating magnet array is on the magnetic rotor assembly and the linear bearing assembly supports the coil stator assembly.

There are other ways of implementing the general concept that is represented by the embodiment of FIGS. 3A and 3B. For example, another embodiment is illustrated by FIG. 6A in which a magnetic rotor assembly 140, which holds an array of torque-generating permanent magnets 142, surrounds a coil stator assembly 144, which holds an array of coils 146. In other respects, the design is very similar to that of FIGS. 3A-B in that there is a lift-generating magnet array 148 on an inner sidewall of the magnetic rotor assembly 140 with the magnetization directions of the magnets axially oriented and a conductive plate 150 supported by the coil stator assembly 144 so that it faces the lift-generating magnet array 148. The magnetic rotor assembly 140 is supported on a shaft 154 (or hub) by a bearing assembly 152 that allows it to rotate about the longitudinal axis of the shaft 154 but not move in an axial direction along that shaft. The coil stator assembly 144, on the other hand, is supported on the shaft 154 by a linear bearing assembly 160 allowing it to move back and forth in an axial direction but not rotate about that shaft 154. The spring assembly 130 exerts a force against the backside of the coil stator assembly 130. As with the embodiment shown in FIGS. 3A-B, the rotating lift magnet array 148 on the magnetic rotor assembly 140 induces eddy currents in the conductive plate 150 which moves the coil stator assembly 144 to the right, decreasing the magnetic engagement length and thereby reducing the torque constant.

Figure 6B:
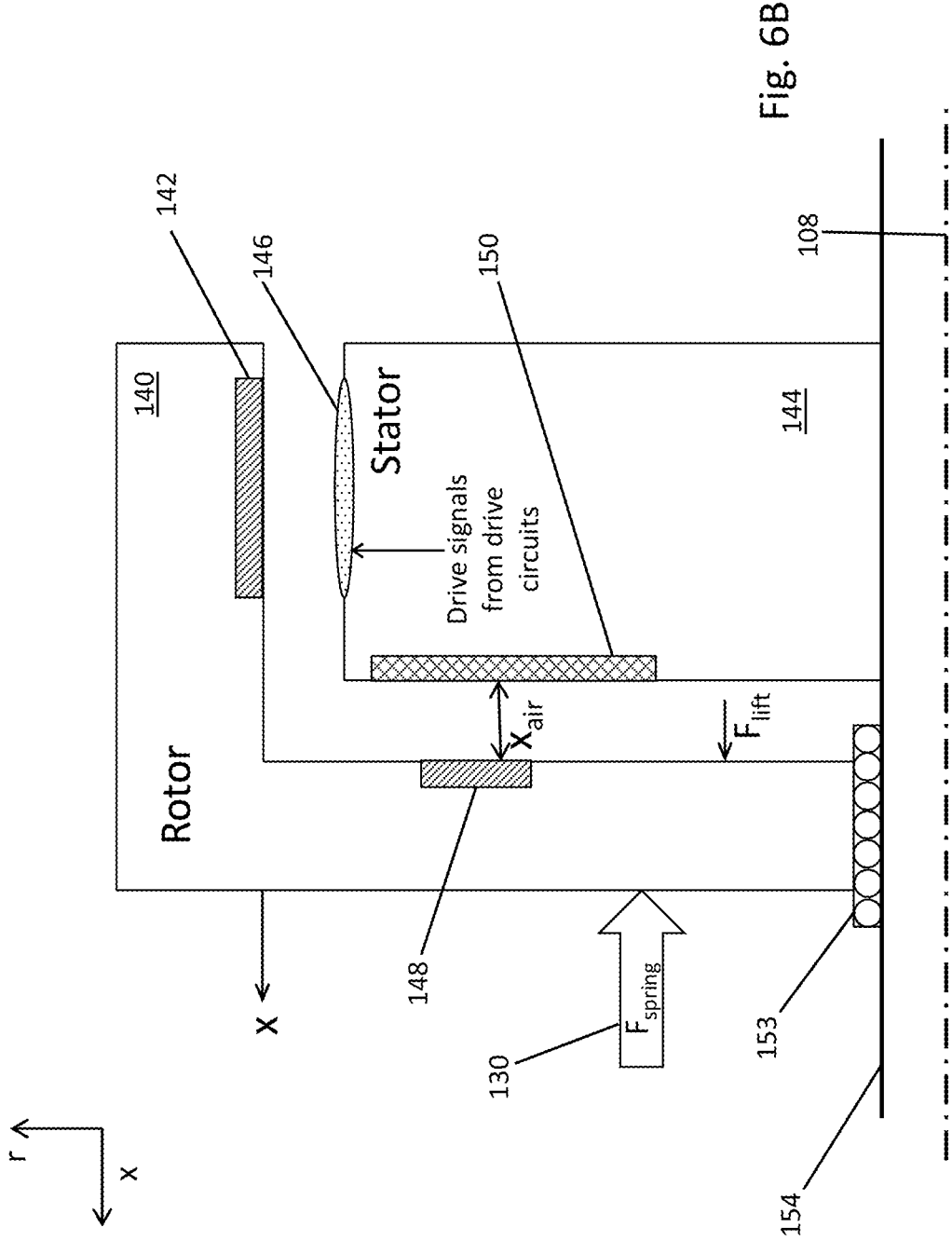
FIG. 6B illustrates an embodiment in which the lift-generating magnet array is on the magnetic rotor assembly, the coil stator assembly is stationary, and the magnetic rotor assembly is supported on the hub by a bearing assembly that permits both rotational movement and axially directed movement of the magnetic rotor assembly.

An arrangement similar to that illustrated by FIG. 6A is shown in FIG. 6B. In this other arrangement, the coil stator assembly 144 is stationary on the shaft 154 (i.e., it can neither rotate or move longitudinally) and the magnet rotor assembly 140 is supported on the shaft 154 by a bearing assembly 153 that enables it to both rotate about the shaft and move back and forth longitudinally on the shaft. In this case, the spring assembly 130 exerts a restorative force against the backside of the magnetic rotor assembly 140.

Figure 7:
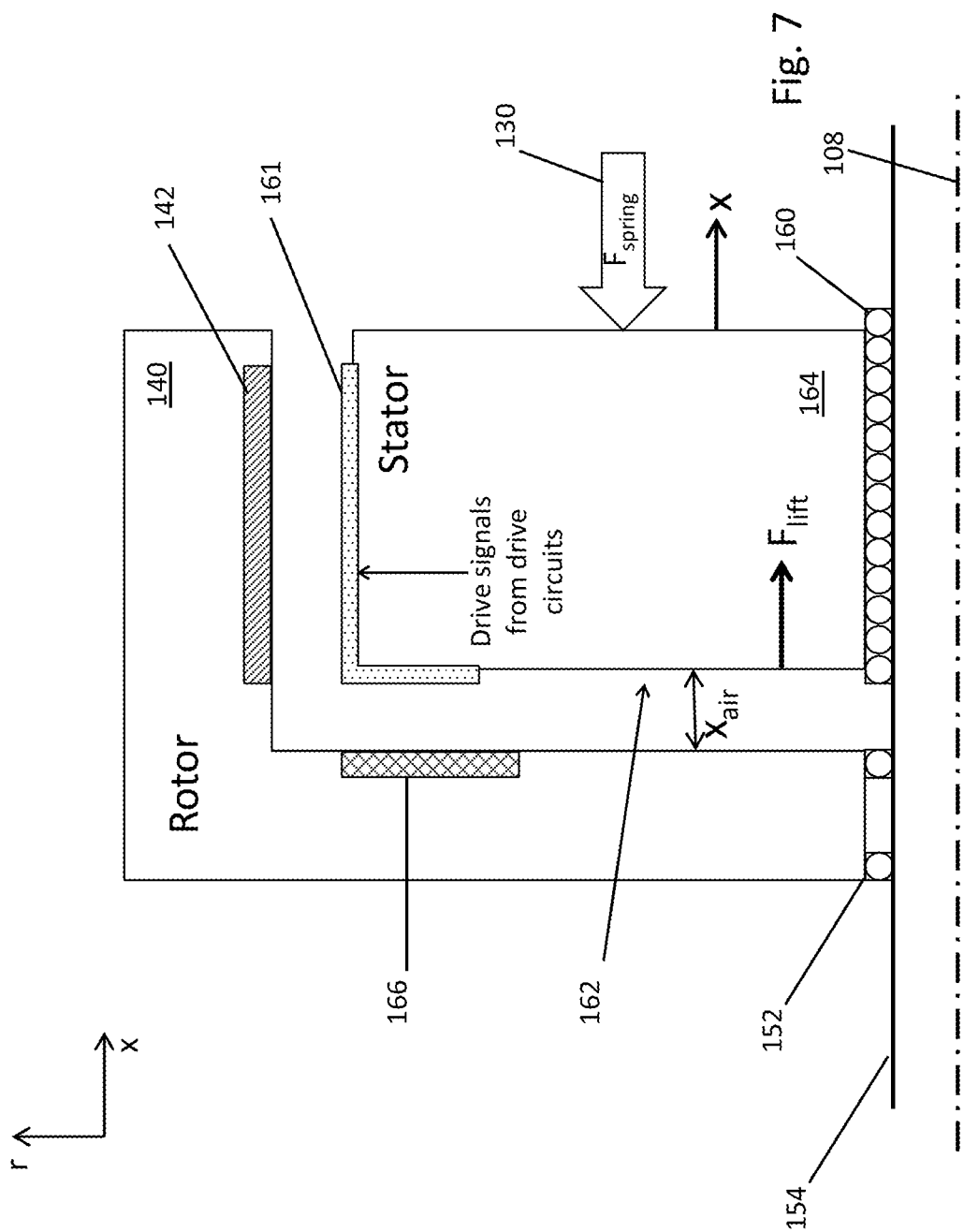
FIG. 7 illustrates an embodiment in which the drive coils on the coil stator assembly also used as the lift-generating elements.

Yet another arrangement is illustrated by FIG. 7 which shows an embodiment that is similar to that illustrated by FIG. 6A except the function performed by the lift magnet array is instead performed by the drive coils 160. More specifically, the drive coils 161 extend from the outer circumference of the coil stator assembly 164 over onto the front face 162 of the coil stator assembly 164 where they also generate a magnetic field directed axially and toward the conductive plate 166 on the magnetic rotor assembly 140. That axially directed magnetic field induces eddy currents in the rotating conductive plate 166 thereby generating a lift force that pushes the coil stator assembly 164 to the right against the spring 130 and to a new location depending on the rate of rotation.

Figure 8:
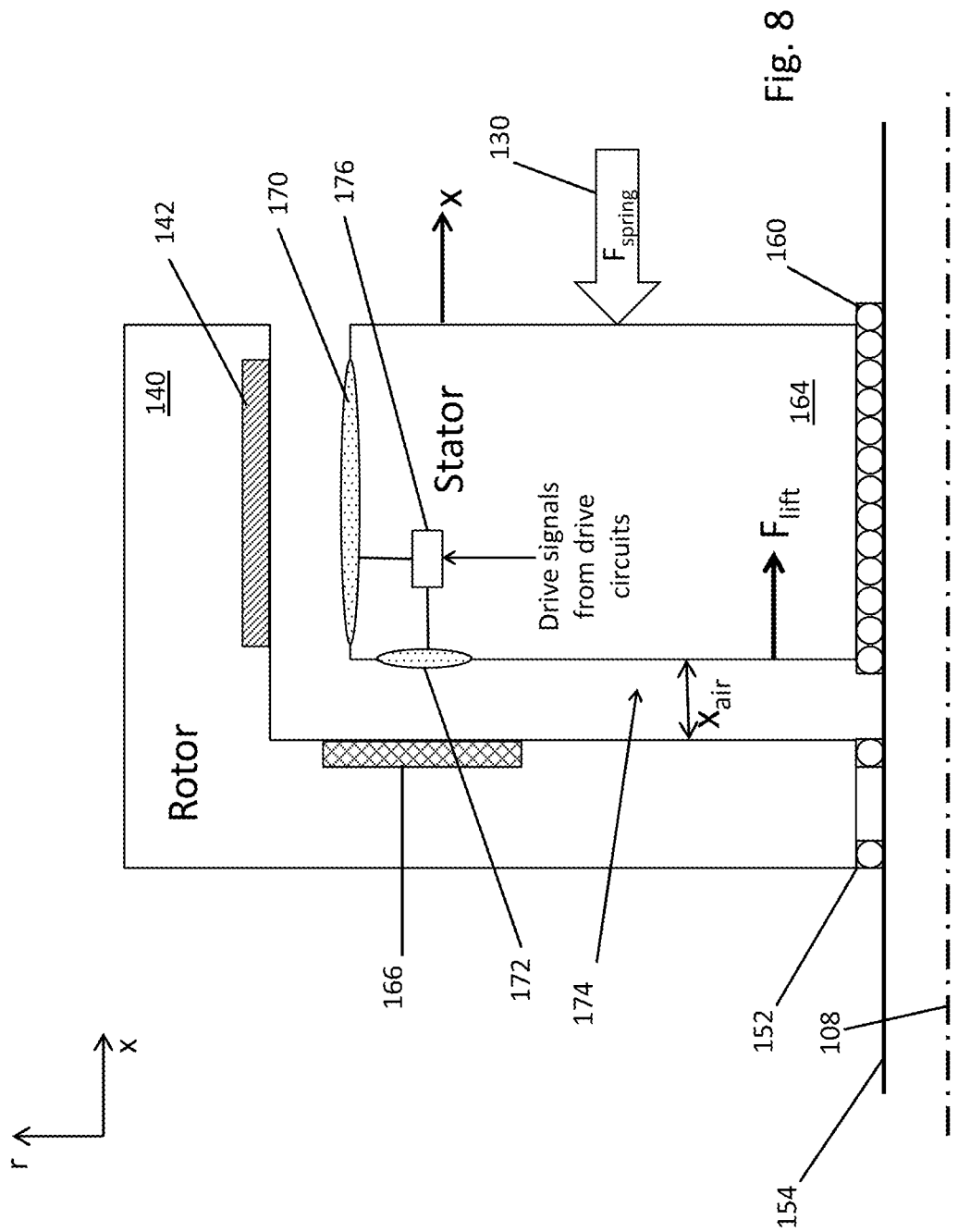
FIG. 8 illustrates an embodiment which employs an array of lift-generating coils on the coil stator assembly that is different from the array of drive.

Still another approach is illustrated by FIG. 8 which shows an embodiment that is similar to that illustrated by FIG. 7 except instead of using the drive coils 170 to generate the field that induces the lift force, separate lift-generating coils 172 are used. In other words, on the face 174 of the coil stator assembly 164 that is opposite and faces the conductive plate 166 on the magnetic rotor assembly 140 there are lift-generating coils 172 arrayed around the coil stator assembly 164 and in alignment with the conductive plate 166. In this embodiment, the lift coils are equal in number to the drive coils and they receive the same drive signal. Thus, there is a bus 176 to which the drive signals are delivered and to which corresponding lift and drive coils are connected.

Figure 9:
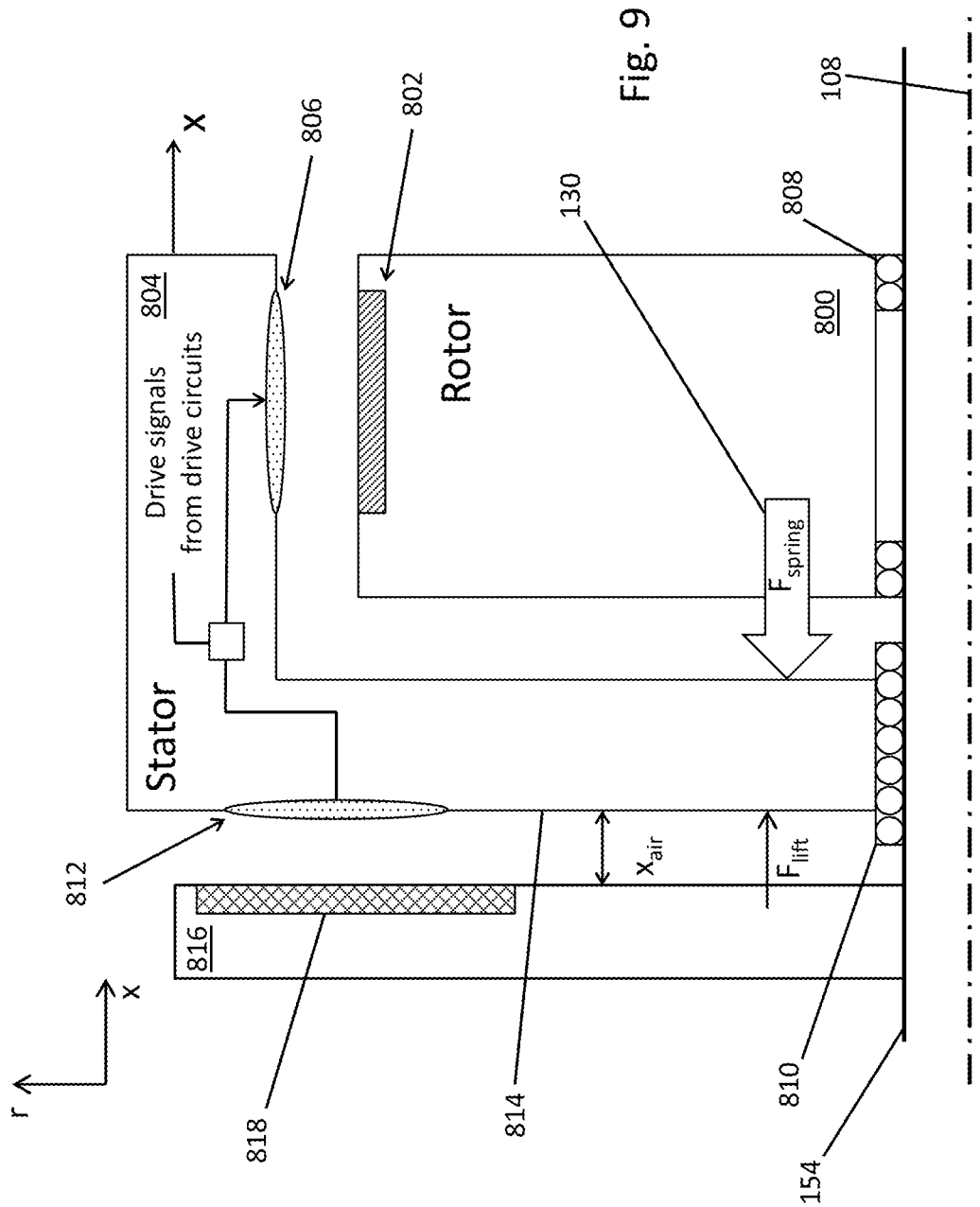
FIG. 9 illustrates an embodiment in which one component of the lift-generating mechanism (e.g. the conductive plate) is supported by a part of the motor that is neither the coil stator assembly nor the magnetic rotor assembly.

In all of the embodiments described thus far, one of the elements that was involved in the generating the lift force was a rotating element, namely, the magnetic rotor assembly. Other embodiments are possible for which this is not the case. See, for example, the embodiment illustrated by FIG. 9. In this embodiment, the magnetic rotor assembly 800 carries the torque-generating magnet array 802 and it rotates within the coil stator assembly 804 that carries the drive coil array 806. The magnetic rotor assembly 800 is mounted on the hub assembly 154 through bearings 808 which enable it to rotate about the rotational axis 108 of the shaft 154. The coil stator assembly 804 is supported on the shaft 154 by a set of linear bearings 810 that permit it to move back and forth along the shaft 154 in an axial direction but do not permit it to rotate about the shaft. The non-rotating coil stator assembly 804 also includes the lift-generating coil array 812 on its backside 814, i.e., the side facing away from the magnetic rotor assembly 800. Adjacent to the backside of the coil stator assembly 804 there is a disk (or structure) 816 that is fixedly mounted on the shaft 154 so that it can neither rotate nor move in an axial direction along the shaft. The disk 816 includes an annularly shaped conductive plate 818 that faces the lift-generating coil array 812 on the backside of the coil stator assembly 804. The spring assembly 130 pushes against the coil stator assembly 804 urging it towards the disk 816 and against a stop (not shown) when no signal is applied to the lift-generating coil array 812. In this particular embodiment, the signals that drive the lift-generating coil array 812 are the same as the drive signals that drive the drive coil array 806. (The lift-generating coil array 812 could be driven separately by different signals.)

During operation, the drive signals applied to the lift-generating array will produce a magnetic field at the conductive plate 818 that changes in accordance with the changing drive signals. This will induce eddy currents in the conductive plate which will, in turn, produce a lift force that pushes the coil stator assembly 804 away from the disk 816 and against the return force produced by the spring assembly 130, as previously described.

Figure 10:
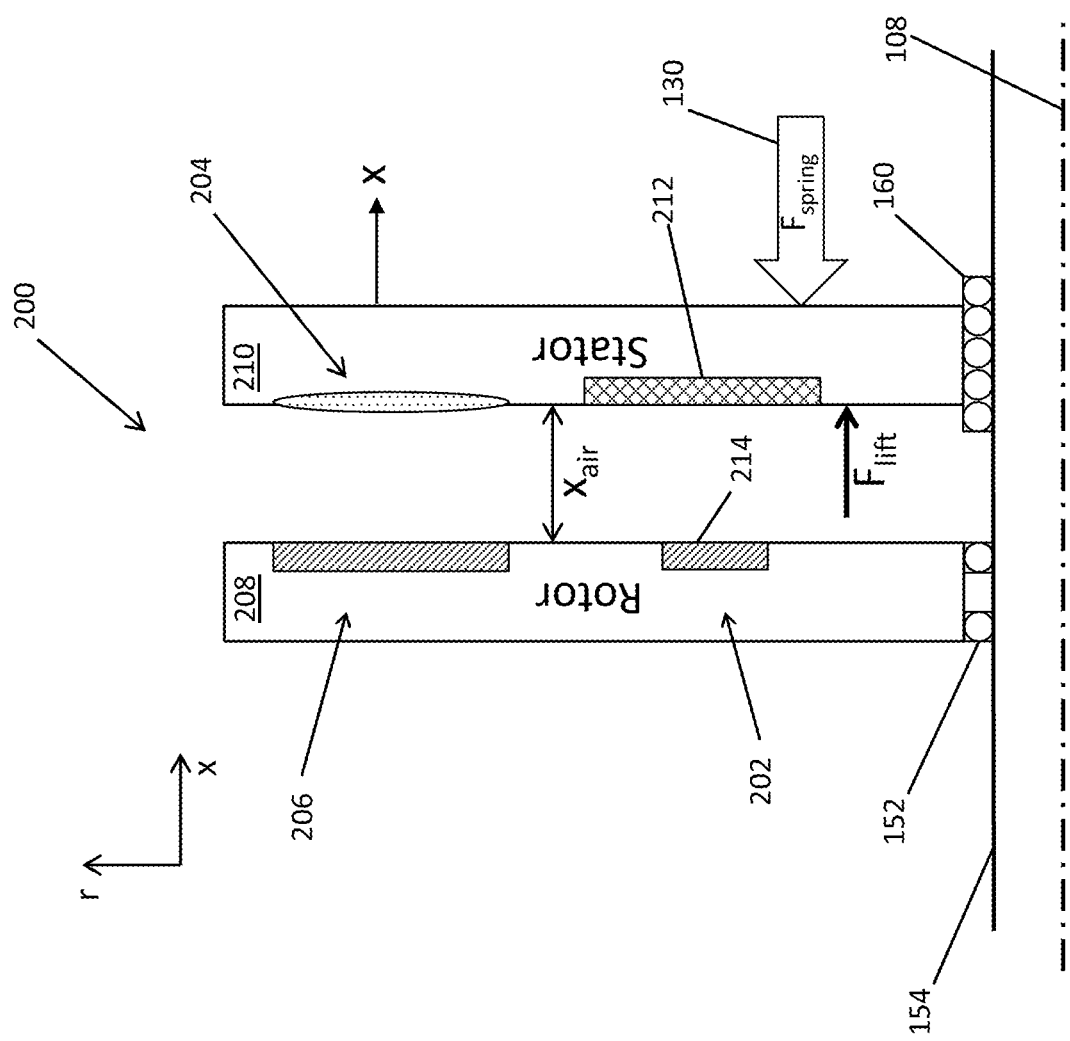
FIG. 10 illustrates an axial flux motor that employs the lift-generating mechanism to implement the variable torque coefficient.

The examples provided so far all involve radial flux permanent magnet synchronous motors. The concepts are also applicable to axial flux permanent magnet synchronous motors as well. FIG. 10 depicts an axial flux motor 200 that employs a lift magnet array 202 to vary the width, $x_{air}$, of the gap between the drive coils 204 and the torque-generating magnets 206 of the magnetic rotor assembly 208. The coil stator assembly 210 has an array of drive coils 204 arrayed around the periphery of the coil stator assembly 210. On an opposing face of the magnetic rotor assembly 208 there is a group of magnets arrayed around the periphery of the rotor assembly. The magnets of the magnet array have their magnetization directions axially directed in some pattern such as, without limitation: N-S-N-S-N . . . ; 2N-2S-2N-2S . . . ; or a Halbach array. On the same face of the magnetic rotor assembly 208 and closer to the rotational axis there is also a set of lift-generating magnets 214 arrayed around the rotational axis. These magnets also have their magnetization directions axially directed to produce a magnetic field that changes from a positive axial direction to a negative axial direction as one moves around the array of magnets. On a corresponding location of the opposing face of the coil stator assembly (the same face on which the drive coils are located), there is a conductive plate 212. As the magnetic rotor assembly rotates, the interaction of the magnetic field of the lift array with the conductive plate generates a lift force as previously described and causes the coil stator assembly to move to the right reducing the coupling between the drive coils and the torque-generating magnet array and thereby reducing the torque coefficient for the motor. In other respects, the motor of FIG. 10 operates the same as has been previously described for the other embodiments with certain numbered elements performing the functions of previously described like-numbered elements.

Other embodiments are within the following claims. For example, either the magnetic rotor assembly or the coil stator assembly could rotate with the other part being non-rotating. Generally, the part with the coils will be the non-rotating part; otherwise, a commutator (as is typically found in DC brushed motors) would be needed. Similarly, the lift magnets and the conductive material could be exchanged so that the lift magnets are on the coil stator assembly and the conductive material is on the magnetic rotor assembly. The concepts work either way; however, some tradeoffs such as a need to limit inertia may inform the decision. Also note that these concepts are generally applicable to motor types other than AC permanent magnet synchronous motors.

What is claimed is:

1. An electric motor comprising:
   a first subsystem and a second subsystem, one of the first and second subsystems comprising a magnetic rotor assembly and the other one of the first and second subsystems comprising a coil stator assembly;
   a hub assembly supporting the magnetic rotor assembly and the coil stator assembly and defining a rotational axis; and
   a bearing assembly supporting at least one of the first and second subsystems on the hub assembly,
   wherein the magnetic rotor assembly comprises an array of torque-generating magnets;
   wherein the coil stator assembly comprises an array of driving coils opposing the array of torque-generating magnets of the magnetic stator assembly;
   wherein the first subsystem comprises an array of lift-generating elements for generating axially directed magnetic fields;
   wherein the second subsystem comprises an electrically conductive region aligned with and opposite to the array of lift-generating elements of the first subsystem, the array of lift-generating elements and the electrically conductive region separated from each other in the axial direction by a separation distance; and
   wherein the bearing assembly enables the magnetic rotor assembly to rotate about the rotational axis of the hub assembly and enables the separation distance of the magnetic rotor assembly and the coil stator assembly to change in response to a lift force generated by the movement of the array of lift-generating elements and the electrically conductive region with respect to each other.

2. The electric motor of claim 1, wherein the array of lift-generating elements comprises at least one of an array of permanent magnets or an array of electric coils.

3. The electric motor of claim 1, wherein the bearing assembly supports the magnetic rotor assembly on the hub assembly and enables the magnetic rotor assembly to rotate about the rotational axis and to move back and forth longitudinally along the rotational axis.

4. The electric motor of claim 1, wherein the second subsystem comprises an annularly shaped conductive plate that forms the electrically conductive region.

5. The electric motor of claim 1, wherein the electric motor is configured to apply a restorative force opposing the lift force to maintain the separation distance of the magnetic rotor assembly and the coil stator assembly.

6. The electric motor of claim 1, further comprising:
   a spring assembly, coupled to one of the first or second subsystems, to apply a substantially constant restorative force opposing the lift force.

7. An electric motor comprising:
   a shaft defining a rotation axis;
   a rotor disposed about the shaft and configured to rotate about the rotation axis;
   a stator, mechanically coupled to the shaft, having an electrically conductive region;
   a coil disposed on the stator;
   a first magnet disposed on the rotor and magnetically coupled to the coil; and
   a second magnet disposed on the rotor and configured to induce eddy currents in the electrically conductive region when the rotor rotates about the rotation axis with respect to the stator, the eddy currents producing a repulsive force between the electrically conductive region and the second magnet that moves the stator with respect to the rotor to change the magnetic coupling between the first magnet and the coil.

8. The electric motor of claim 7, wherein the repulsive force has a magnitude that depends on a rotational speed of the rotor and a distance between the stator and the rotor.

9. The electric motor of claim 8, further comprising:
a spring assembly coupled to the stator and configured to apply a restorative force to the stator opposing the repulsive force, the restorative force balancing the repulsive force when the distance between the stator and the rotor equals a first distance to maintain a desired magnetic coupling between the first magnet and the coil corresponding to the first distance.

10. The electric motor of claim 9, wherein the coil is configured to:
receive a drive signal that causes the coil to produce a magnetic field, the magnetic field producing a torque that varies the rotational speed of the rotor, thereby changing the magnitude of the repulsive force and the distance between the stator and the rotor from the first distance to a second distance.

11. The electric motor of claim 9, wherein the restorative force is substantially constant.

12. The electric motor of claim 7, wherein the stator is configured to move with respect to the rotor along a direction of the repulsive force.

13. The electric motor of claim 7, wherein:
the rotor is coupled to the shaft by a first bearing assembly and the stator is coupled to the shaft by a second bearing assembly;
the first bearing assembly is configured to prevent the rotor from moving axially with respect to the shaft; and
the second bearing assembly is configured to constrain the stator to move axially with respect to the shaft.

14. The electric motor of claim 7, wherein the electrically conductive region comprises a conductive plate disposed on the stator.

15. The electric motor of claim 7, wherein the electrically conductive region is shaped as a ring that encircles the rotation axis.

16. A method of adjusting a magnetic coupling between an electromagnet and a magnet in an electric motor, the method comprising:
moving a magnetic field-generating element coupled to one of the electromagnet and the magnet with respect to an electrically conductive region coupled to the other one of the electromagnet and the magnet;
in response to moving the magnetic field-generating element, inducing eddy currents in the electrically conductive region so as to produce a repulsive force between the electrically conductive region and the magnetic field-generating element; and
applying the repulsive force to at least one of the electrically conductive region or the magnetic field-generating element so as to change at least one of an overlap or a separation distance between the electromagnet and the magnet thereby adjusting the magnetic coupling between the electromagnet and the magnet.

17. The method of claim 16, further comprising:
while applying the repulsive force, applying a restorative force that opposes the repulsive force to the at least one of the electrically conductive region or the magnetic field-generating element.

18. The method of claim 17, wherein the restorative force balances the repulsive force when a distance between the electrically conductive region and the magnetic field-generating element equals a first distance.

19. The method of claim 16, further comprising:
applying a drive signal to the electromagnet, the drive signal causing the electromagnet to produce a magnetic field, the magnetic field producing a torque;
applying the torque to the magnet, the torque changing a relative speed between the electrically conductive region and the magnetic field-generating element thereby changing a magnitude of the repulsive force;
in response to the relative speed between the electrically conductive region and the magnetic field-generating element decreasing, decreasing the magnitude of the repulsive force so as to decrease the distance between the electrically conductive region and the magnetic field-generating element thereby increasing the magnetic coupling between the electromagnet and the magnet; and
in response to the relative speed between the electrically conductive region and the magnetic field-generating element increasing, increasing the magnitude of the repulsive force so as to increase the distance between the electrically conductive region and the magnetic field-generating element thereby decreasing the magnetic coupling between the electromagnet and the magnet.

20. The method of claim 16, wherein the magnetic field-generating element is a coil and inducing eddy currents in the electrically conductive region comprises:
applying a drive signal to the coil to produce a magnetic field; and
applying the magnetic field to the electrically conductive region thereby inducing eddy currents in the electrically conductive region.

* * * * *